(12) United States Patent
Yoshizawa et al.

(10) Patent No.: US 7,593,874 B1
(45) Date of Patent: Sep. 22, 2009

(54) CALL CENTER COMMISSIONED-SERVICE CHARGE BILLING SYSTEM

(75) Inventors: Isao Yoshizawa, Tokyo (JP); Kenichiro Uehara, Tokyo (JP)

(73) Assignee: Kawasaki Steel Systems R & D Corporation, Tokyo (JP)

( * ) Notice: Subject to any disclaimer, the term of this patent is extended or adjusted under 35 U.S.C. 154(b) by 1540 days.

(21) Appl. No.: 10/220,203

(22) PCT Filed: Jul. 24, 2000

(86) PCT No.: PCT/JP00/04924

§ 371 (c)(1),
(2), (4) Date: Aug. 29, 2002

(87) PCT Pub. No.: WO01/78363

PCT Pub. Date: Oct. 18, 2001

(30) Foreign Application Priority Data

Apr. 11, 2000 (JP) ............................. 2000-109229

(51) Int. Cl.
*G07F 19/00* (2006.01)
*H04M 15/00* (2006.01)
(52) U.S. Cl. ............................. 705/34; 705/32; 705/30
(58) Field of Classification Search ........................ None
See application file for complete search history.

(56) References Cited

U.S. PATENT DOCUMENTS

| 5,499,291 | A | | 3/1996 | Kepley |
| 5,799,077 | A | | 8/1998 | Yoshii |
| 5,960,070 | A | * | 9/1999 | O'Donovan ............ 379/114.01 |
| 6,427,000 | B1 | * | 7/2002 | Mumford et al. ............... 379/9 |
| 6,999,574 | B2 | * | 2/2006 | Baker .................... 379/218.01 |
| 2001/0043697 | A1 | * | 11/2001 | Cox et al. ............. 379/265.06 |

FOREIGN PATENT DOCUMENTS

JP          A 9-252351          9/1997

* cited by examiner

*Primary Examiner*—F. Zeender
*Assistant Examiner*—Christopher Buchanan
(74) *Attorney, Agent, or Firm*—Oliff & Berridge, PLC

(57) ABSTRACT

An operator number setting control unit 45 sets the number of contracted operators for a commissioned call center service in response to a request of a user. A log-in time collecting control unit 42 calculates the log-in time of the operator. A log-in time computing unit 43 adds respective log-in times for each user. A billed service charge computing device 44 calculates an amount of charge billed in accordance with the total sum of log-in time added for each user. A charge is calculated and billed as such for the amount of use of commissioned call center services in accordance with the usage pattern of users, thereby promoting the commissioning of call center services and making it possible to operate a call center system without a huge amount of capital investment.

20 Claims, 13 Drawing Sheets

OPERATOR NUMBER MANAGEMENT TABLE
(MANAGED FOR EACH SITE)

| SITE NUMBER | NUMBER OF OPERATORS |
|---|---|
| 1 | N |

FIG.9

LOG-IN TIME MANAGEMENT TABLE (MANAGED FOR EACH SITE)

| SITE NUMBER | OPERATOR ID | CAMPAIGN ID | CAMPAIGN IDENTIFIER | LOG-IN TIME OF DAY | LOG-IN TIME (MINUTE) |
|---|---|---|---|---|---|
| 1 | OP 1 | CAMP 1 | P | 9:00 | 480 |
| 1 | OP 2 | CAMP 1 | P | 10:00 | 420 |
| ... | ... | ... | ... | ... | ... |
| 1 | OPM | CAMP 2 | B | 9:00 | 420 |

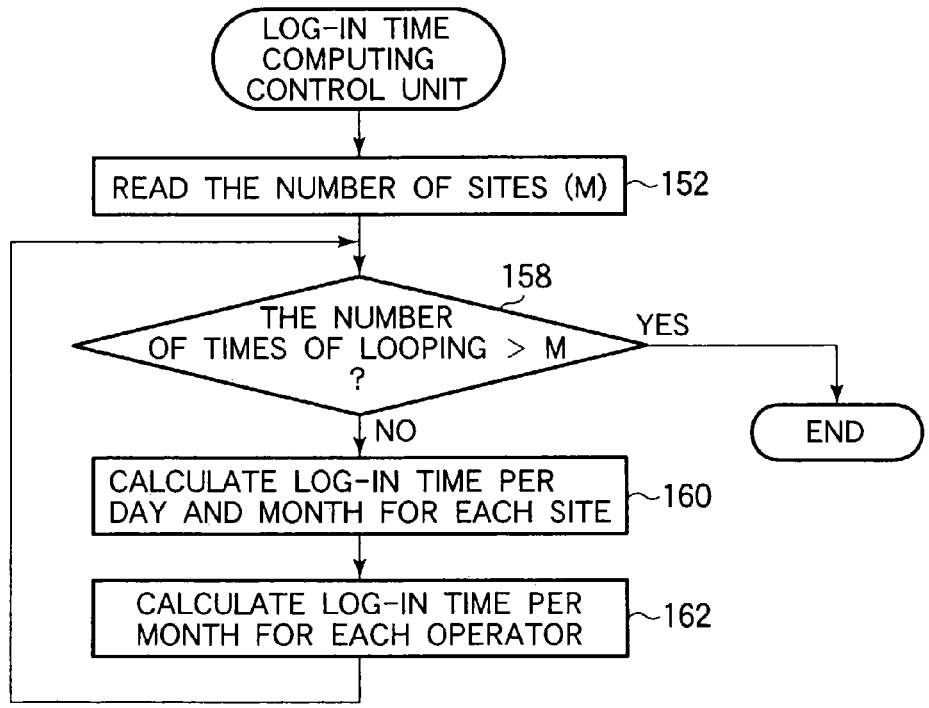

CAMPAIGN-BY-CAMPAIGN BILLED AMOUNT TABLE

| TYPE OF CAMPAIGN | THE AMOUNT BILLED FOR ONE HOUR LOGGED IN BY ONE OPERATOR (JAPANESE YEN) |
|---|---|
| PREDICTIVE | 100 |
| PREVIEW | 50 |
| INBOUND | 20 |
| BLEND | 100 |

FIG.16

AMOUNT BILLED PER DAY AND MONTH FOR EACH SITE

| NAME OF OPERATOR | TYPE OF CAMPAIGN | | | | TOTAL |
|---|---|---|---|---|---|
| | PREDICTIVE | PREVIEW | INBOUND | BLEND | |
| OPERATOR A | 800 | 0 | 0 | 0 | 800 |
| OPERATOR B | 800 | 0 | 0 | 0 | 800 |
| OPERATOR C | 0 | 0 | 400 | 0 | 400 |
| ..... | ..... | ..... | ..... | ..... | ..... |
| | 0 | 40 | 0 | 600 | 640 |
| TOTAL | xxxxxx | xxxxxx | xxxxx | xxxxx | xxxxx |

FIG.17

OPERATOR-BY-OPERATOR TABLE OF AMOUNT BILLED PER MONTH
OPERATOR A

| SERVICE DATE | TYPE OF CAMPAIGN | | | | TOTAL |
| --- | --- | --- | --- | --- | --- |
| | PREDICTIVE | PREVIEW | INBOUND | BLEND | |
| FEB. 1, 2000 | 800 | 0 | 0 | 0 | 800 |
| FEB. 2, 2000 | 800 | 0 | 0 | 0 | 800 |
| FEB. 2, 2000 | 0 | 0 | 400 | 0 | 400 |
| ..... | ..... | ..... | ..... | ..... | ..... |
| FEB. 29, 2000 | 0 | 40 | 0 | 600 | 640 |
| TOTAL | xxxxx | xxxxx | xxxxx | xxxxx | xxxxxx |

| NUMBER OF OPERATORS | AMOUNT BILLED FOR ONE OPERATOR |
|---:|---:|
| 5 | 98 |
| 10 | 96 |
| 50 | 78 |
| 100 | 61 |
| 150 | 48 |
| 200 | 37 |
| 250 | 29 |
| 300 | 23 |
| 350 | 18 |
| 400 | 14 |
| 450 | 11 |
| 500 | 9 |
| 600 | 5 |
| 700 | 4 |
| 800 | 2 |
| 900 | 2 |
| 1000 | 1 |

CALL CENTER COMMISSIONED-SERVICE CHARGE BILLING SYSTEM

TECHNICAL FIELD

The present invention relates to a call center commissioned-service charge billing method for billing a charge to one or more users commissioning a call center service. More particularly, the present invention relates to a call center commissioned-service charge billing method, a call center commissioned-service charge billing system, and a computer readable storage medium, having a computer program stored thereon, related to the call center commissioned-service charge billing system, all of which serve to calculate and bill a charge for the amount of use of commissioned call center services in accordance with the usage pattern of users, thereby promoting the commissioning of call center services and making it possible to provide a technique of operating a call center system without a huge amount of capital investment.

BACKGROUND ART

A call center system is largely divided into inbound service and outbound service.

The inbound service is to receive customer-initiated telephone calls and others. In the inbound service, facisimile and electronic mail are also received in addition to telephone calls. Accordingly, utilized are operators, voice response devices, facsimile machines, and electronic mail related devices.

On the other hand, the outbound service is to handle outgoing calls from call centers. For the outgoing calls, use is made of the predictive calling function typical of the projected calling and the preview calling function for an operator to confirm a called receiver and then provide a calling service by the intention of the operator. In addition, there is also available a system provided with an inbound function for receiving only inbound calls from customers, and with a blend function that enables both services of the predictive calling function and the inbound function.

For a conventional call center system, facilities such as a PBX, voice response device, CTI server, mail server, facsimile server, and predictive calling device are purchased to construct the system in order to provide inbound and/or outbound services. This has required a significant capital investment and operations of the call center system for a long period of time to turn the system into a profit center in order to recoup the capital investment.

Furthermore, in both the inbound and outbound services, there occur variations in the services such as busy and idle periods. This has often led to such a case where effective use of the facilities is not made.

DISCLOSURE OF THE INVENTION

The present invention was developed to solve the aforementioned conventional problems. It is therefore an object of the present invention to provide a call center commissioned-service charge billing system that serves to calculate and bill a charge for the amount of use of commissioned call center services in accordance with the usage pattern of users, thereby promoting the commissioning of call center services and making it possible to operate a call center system without a huge amount of capital investment.

First, the call center commissioned-service charge billing method according to the first invention of the present application is a method for billing a charge to one or more users commissioning a call center service. The method solves the aforementioned problems by comprising the steps of setting the number of contracted operators for a commissioned call center service in response to a request of the user; calculating a log-in time of the operator; adding respective log-in times for each user; and calculating an amount of charge billed in accordance with the total sum of log-in time added for each user.

In addition, the call center commissioned-service charge billing method according to the second invention of the present application is a method for billing a charge to one or more users commissioning a call center service. The method solves the aforementioned problems by comprising the steps of setting the number of contracted operators for a commissioned call center service in response to a request of the user; calculating the number of effective connections through which the operators have succeeded in contacting with a customer; adding respective number of times of contact for each user; and calculating an amount of charge billed in accordance with the total number of times of contact added for each user.

Next, the call center commissioned-service charge billing system according to the third invention of the present application is a system for billing a charge to one or more users commissioning a call center service. The system solves the aforementioned problems by comprising means for setting the number of contracted operators for a commissioned call center service in response to a request of the user; means for calculating a log-in time of the operator; means for adding respective log-in times for each user; and means for calculating an amount of charge billed in accordance with a total sum of log-in time added for each user.

In addition, the call center commissioned-service charge billing system according to the fourth invention of the present application is a system for billing a charge to one or more users commissioning a call center service. The system solves the aforementioned problems by comprising means for setting the number of contracted operators for a commissioned call center service in response to a request of the user; means for calculating the number of effective connections through which the operators have succeeded in contacting with a customer; means for adding respective number of times of contact for each user; and means for calculating an amount of charge billed in accordance with the total number of contacts added for each user.

Next, the computer readable storage medium according to the fifth invention of the present application solves the aforementioned problems by providing a computer readable storage medium having a computer program stored thereon for implementing the call center commissioned-service charge billing system according to the aforementioned third or fourth invention.

The action of the present invention is briefly explained below.

The present invention provides a method and system for billing a charge to one or more users commissioning a call center service. With this method and system, a charge is billed in response to actually provided respective inbound and outbound services to a user commissioning a call center service. This makes it possible to operate a call center system without a huge amount of capital investment.

In addition, in the present invention, the log-in time of an operator is calculated and respective log-in times are added to yield the total for each user, then an amount of charge billed being calculated in accordance with the total log-in time. Alternatively, the number of times of effective contact of an operator with a customer is calculated and a respective number of times of contact is added as the total for each user, then the amount of charge billed being calculated in accordance with the total number of times of contact.

For outbound services in a call center, different handling contents require different operation time periods. For example, outbound calls aimed at housewives may be provided during daytime, however, those aimed at workers would need to be provided after their work or during weekends. In addition, outbound services have to be provided, for example, seasonally for a summer gift sales battle and during a particular period of time for an election campaign. According to the present invention, a commissioned call center service can be provided when desired for operation. In addition, since the charge is calculated for the time logged in by an operator, the amount of the cost for commissioned services corresponds to the effect that is obtained by operating the call center, thereby providing an economical merit to the commissioning party in this point.

In addition, for inbound services in a call center, different handling contents cause different periods of time during which a greater amount or less amount of customer-initiated inbound calls occur. In the case of inbound services, some calls may be received even during daytime when housewives are targeted, however, when workers are targeted, a less amount of calls may be received but a larger amount of calls may be received after their work or during weekends. According to the present invention, since the charge is calculated in response to the number of times of effective connections through which an operator is able to contact with customers, the amount of the cost for commissioned services corresponds to the effect that is obtained by operating the call center, thereby providing an economical merit to the commissioning party in this point.

As described above, according to the present invention, a charge is calculated and billed for the amount of use of commissioned call center services in accordance with the usage pattern of users, thereby promoting the commissioning of call center services and making it possible to provide a technique of operating a call center system without a huge amount of capital investment.

Incidentally, being logged-in is the state of an operator in which the operator is seated at his or her own place and available for serving a customer (or the state available for handling services). For example, the operator himself or herself can conduct a "log-in activity" at a particular device, thereby indicating that the operator has turned into the state available for handling services. On the other hand, when the operator is going to leave his or her seat or to be in the state of being unavailable for handling services, the operator himself or herself can conduct a "log-out activity" at a particular device, thereby indicating that the operator has turned into that state.

In addition, the effective connection through which the operator can contact with a customer may be defined in a variety of ways. In addition, depending on the contents of definition, it is also possible to determine automatically whether or not a connection is effective. For example, the effective connection may be defined as a call with a customer for a predetermined period of time or more. In this case, it is also possible to measure the period of time for a connection and determine automatically whether or not the connection is an effective one. In addition, the effective connection may be defined as a call when the address and name of a customer are obtained. In this case, it is also possible to determine a call automatically as an effective connection when an operator has entered the address and name of a customer into a computer. Alternatively, for purposes of receiving an order for a merchandise such as in a reception of a mail order, upon connection to a customer, a case where an order for a merchandize has been actually obtained may be defined as an effective connection. In this case, it is also possible to determine a call automatically as the effective connection when an operator has entered the address and name of a customer related to the order for the merchandize into a computer. It is possible to state the definition of such effective connections in a contract when signed for commissioning call center services.

BRIEF DESCRIPTION OF THE DRAWINGS

FIG. 9 is a diagram illustrating a log-in time management table to be employed in these embodiments;

FIG. 10 is a diagram illustrating the format of an electronic message to be sent from a CTI control device to the log-in time collecting control unit in these embodiment;

FIG. 11 is a diagram illustrating the format of an electronic message to be sent from the log-in time collecting control unit to the CTI control device in these embodiment;

FIG. 12 is a flowchart illustrating the processing in the log-in time computing unit according to these embodiments;

FIG. 13 is a diagram illustrating a site number management table to be employed in these embodiments;

FIG. 16 is a diagram illustrating a site-by-site table of amount billed per day and month, to be employed in these embodiments;

FIG. 17 is a diagram illustrating an operator-by-operator table of amount billed per month, to be employed in these embodiments;

BEST MODE TO CARRY OUT THE INVENTION

Now, embodiments of the present invention will be explained below in detail with reference to the drawings.

Figure 1:
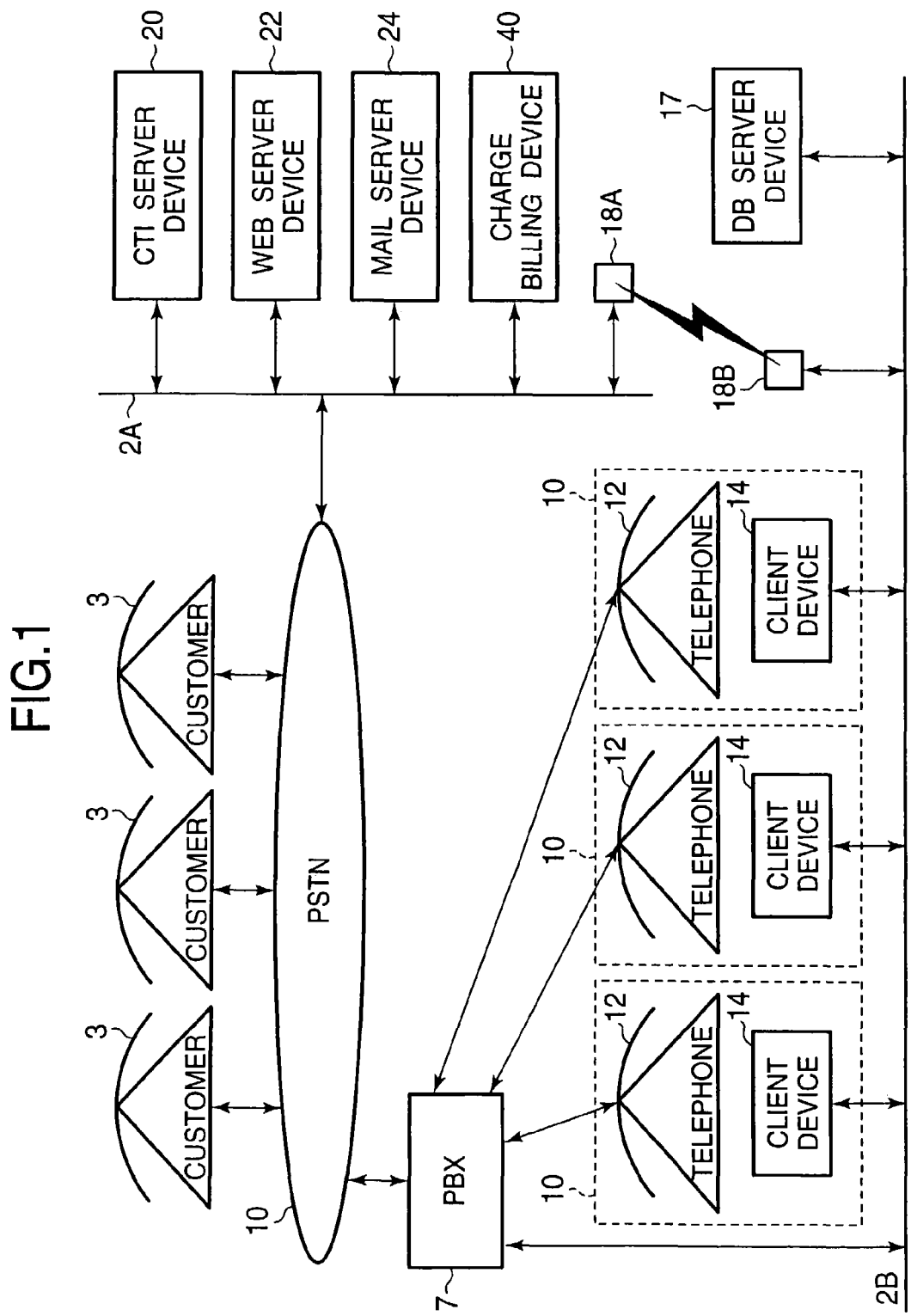
FIG. 1 is a block diagram illustrating the configuration of a call center system common to first to fourth embodiments to which the present invention is applied.

FIG. 1 is a block diagram illustrating the configuration of a call center system according to the embodiments to which the present invention is applied. In this figure, the functional configuration is shown which is common to first to fourth embodiments, described later.

A call center apparatus according to these embodiments comprises a PBX (Private Branch exchange) 7, a plurality of operator devices 10, a CTI (Computer Telephony Integration) server device 20, a Web server device 22, a mail server device 24, and a charge billing device 40. Of these, the CTI server device 20, the Web server device 22, the mail server device 24, and the charge billing device 40 are connected to each other via a LAN (Local Area Network) 2A.

In addition, for example, a connecting device 18A or a connecting device 18B may be provided on the LAN 2A and a LAN 2B as appropriate, respectively, as shown in FIG. 1, thereby allowing the connecting device 18A and the connecting device 18B to connect the LAN 2A and the LAN 2B to each other. For example, in these embodiments, a WAN (Wide Area Network) connects between the connecting devices 18A and 18B. Alternatively, any other communication means may connect between the connecting devices 18A and 18B.

Furthermore, the operator device 10 has a telephone 12 used by an operator to service customer calls, and a client device 14, used by an operator upon servicing customer calls, for displaying necessary information stored in a DB (Data Base) server device 17. Incidentally, the LAN 2B connects between the client device 14 arranged for each operator and the DB (Data Base) server device 17.

In addition, the CTI server device 20 has a CTI control device 32, a pacing control device 34, and a database management device 36.

An inbound service call connected by a customer 3 over the public switched telephone network 1 is received by the PBX 7. At this time, the CTI control device 32 of the CTI server device 20 controls the PBX 7 over the public switched telephone network 1, a path via the connecting devices 18A and 18B, or other dedicated communications line in order to thereby determine which operator device 10 to allow its telephone 12 to receive the call. In addition, for example, when a calling customer can be distinguished based such as on a caller number notification provided by the public switched telephone network 1, it is possible to automatically display customer information regarding the calling customer on the client device 14 for an operator.

In addition, for the outbound service, in the CTI server device 20, the pacing control device 34 provides predictive calling or preview calling based on information that the database management device 36 has. The CTI control device 32 of the CTI server device 20 controls the PBX 7 over the public switched telephone network 1, a path via the connecting devices 18A and 18B, or other dedicated communications line in order to thereby allow the telephone 12 of any one operator device 10 to receive the call connected to the customer 3 by the calling. In addition, at this time, information for distinguishing the calling customer 3 is sent from the CTI server device 20 to the operator device 10, thereby making it possible to automatically display the customer information regarding the corresponding customer 3 on the client device 14 for an operator.

Figure 2:
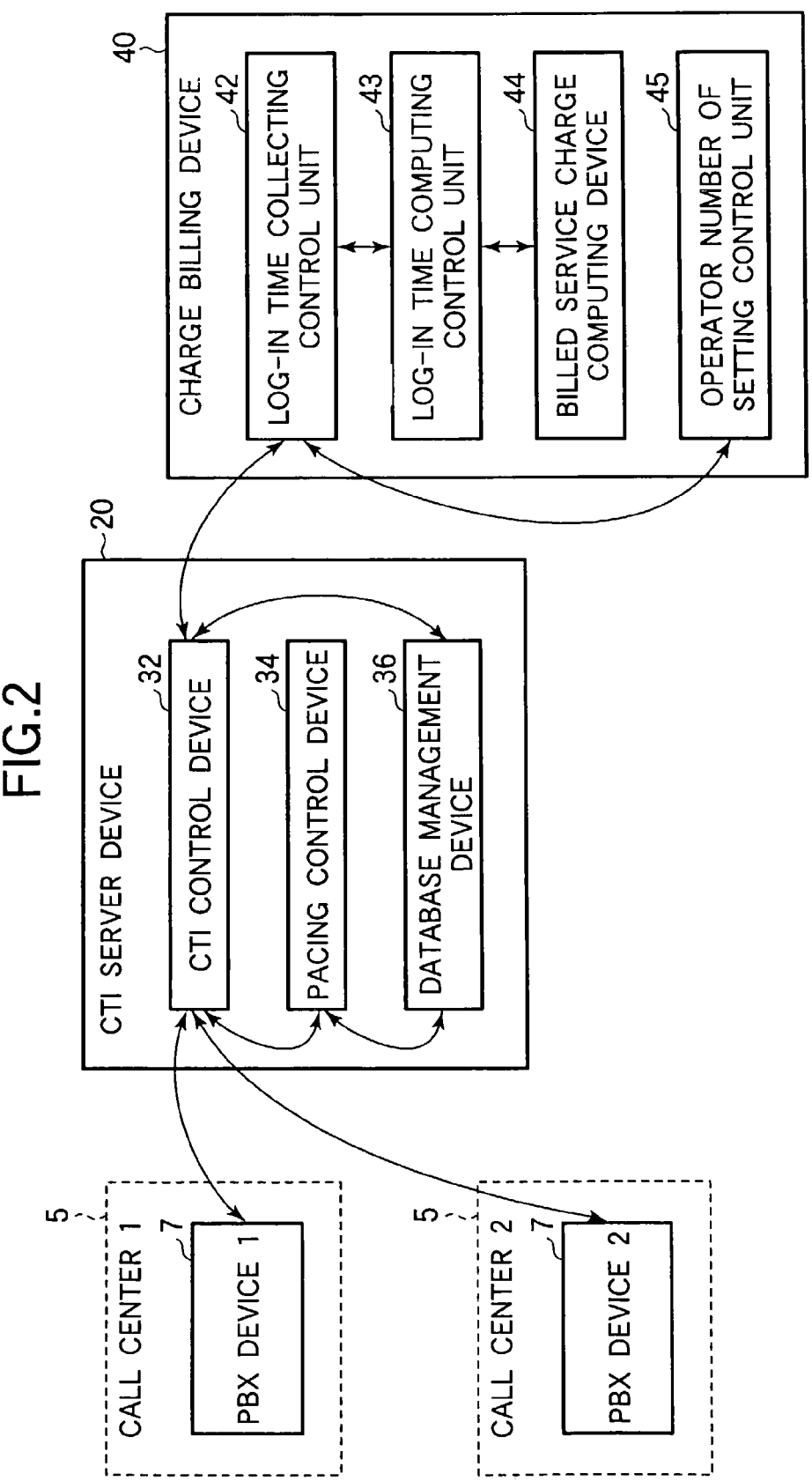
FIG. 2 is a block diagram illustrating the configuration of the first embodiment.

FIG. 2 is a block diagram illustrating the configuration of the first embodiment to which the present invention is applied.

In the first embodiment, two separate call center apparatus 5 are provided, each of which comprises the PBX 7 and a plurality of operator devices 10 (not shown). It is also acceptable to provide more than two separate call center apparatus 5. In addition, one CTI server device 20 is provided for the plurality of separate call center apparatus 5. The CTI server device 20 comprises the CTI control device 32, the pacing control device 34, and the database management device 36. Furthermore, the charge billing device 40 comprising a log-in time collecting control unit 42, a log-in time computing unit 43, a billed service charge computing device 44, and an operator number setting control unit 45 is provided separately from the CTI server device 20.

In this embodiment, a WAN that employs the connecting device 18A, the connecting device 18B, or other equivalent device or communication network connects between the separate call center apparatus 5 and the CTI server device 20 and between the CTI server device 20 and the charge billing device 40. Alternatively, other communication means may connect between them.

Figure 3:
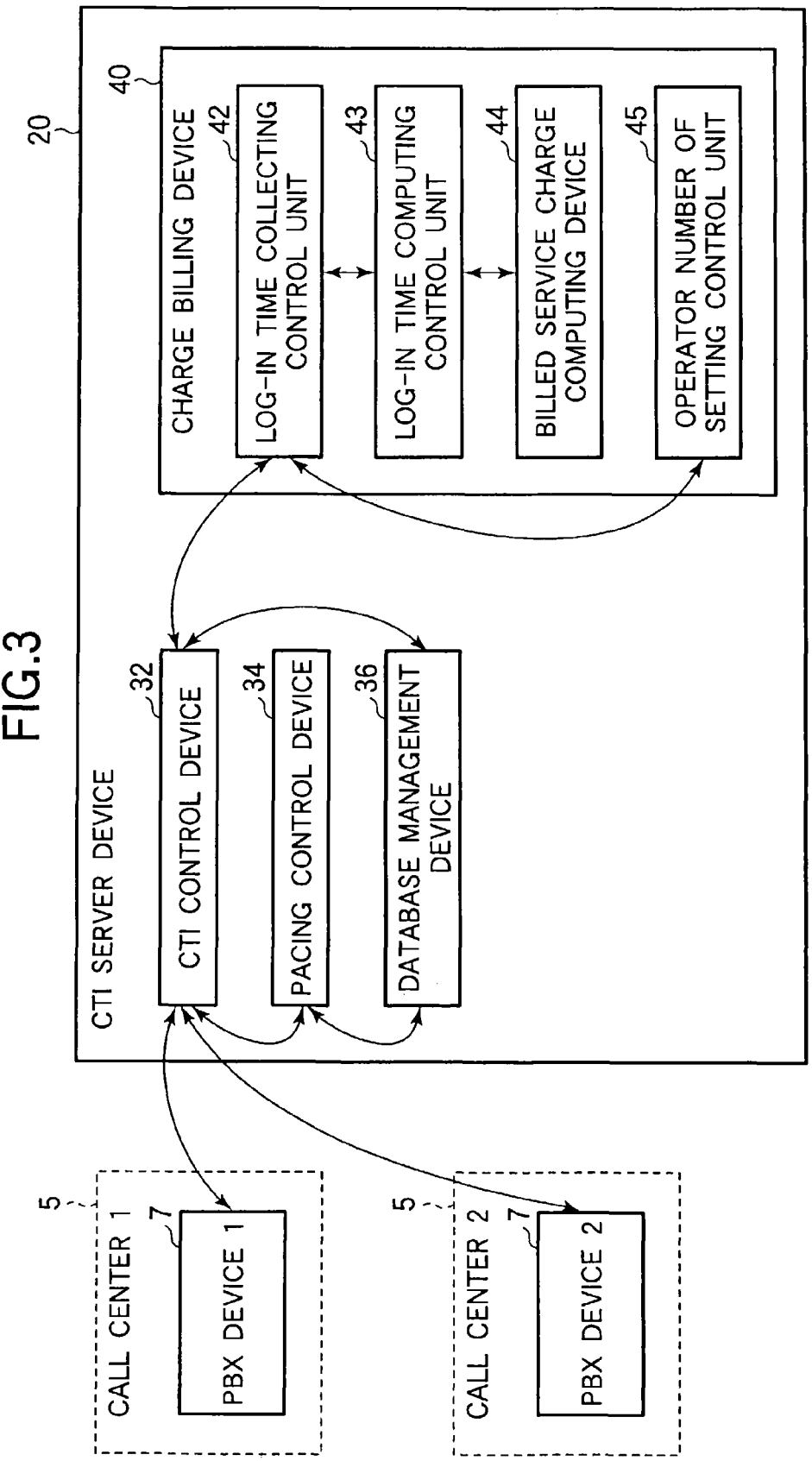
FIG. 3 is a block diagram illustrating the configuration of the second embodiment.

FIG. 3 is a block diagram illustrating the configuration of the second embodiment to which the present invention is applied.

In the second embodiment, two separate call center apparatus 5 are provided, each of which comprises the PBX 7 and a plurality of operator devices 10 (not shown). It is also acceptable to provide more than two separate call center apparatus 5. In addition, one CTI server device 20 is provided for the plurality of separate call center apparatus 5. Furthermore, the charge billing device 40 comprising the log-in time collecting control unit 42, the log-in time computing unit 43, the billed service charge computing device 44, and the operator number setting control unit 45 is provided inside the CTI server device 20.

In this embodiment, a WAN that employs the connecting device 18A, the connecting device 18B, or other equivalent device or communication network connects between the separate call center apparatus 5 and the CTI server device 20. Alternatively, other communication means may connect between them.

Figure 4:
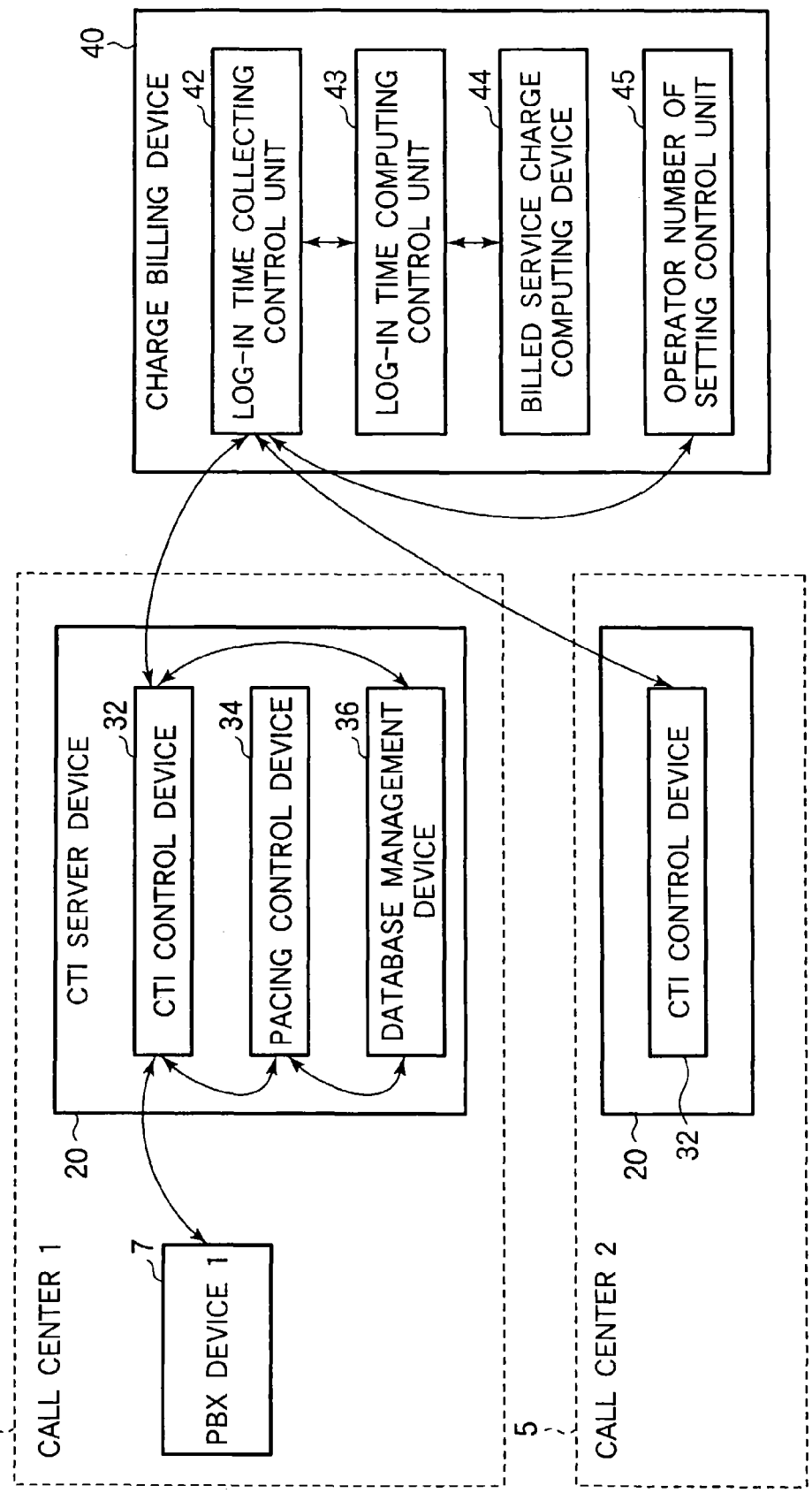
FIG. 4 is a block diagram illustrating the configuration of the third embodiment.

FIG. 4 is a block diagram illustrating the configuration of the third embodiment to which the present invention is applied.

In the third embodiment, the CTI server device 20 is provided in the separate call center apparatus 5 in addition to the fundamental configuration of the call center apparatus 5, each of which comprises the PBX 7 and a plurality of operator devices 10 (not shown). The CTI server device 20 comprises the CTI control device 32, the pacing control device 34, and the database management device 36. In addition, one charge billing device 40 is provided to one separate call center apparatus 5 having such a configuration or a plurality of separate call center apparatus 5. The charge billing device 40 comprises the log-in time collecting control unit 42, the log-in time computing unit 43, the billed service charge computing device 44, and the operator number setting control unit 45.

In this embodiment, a WAN that employs the connecting device 18A, the connecting device 18B, or other equivalent device or communication network connects between the separate call center apparatus 5 and the charge billing device 40. Alternatively, other communication means may connect between them.

Figure 5:
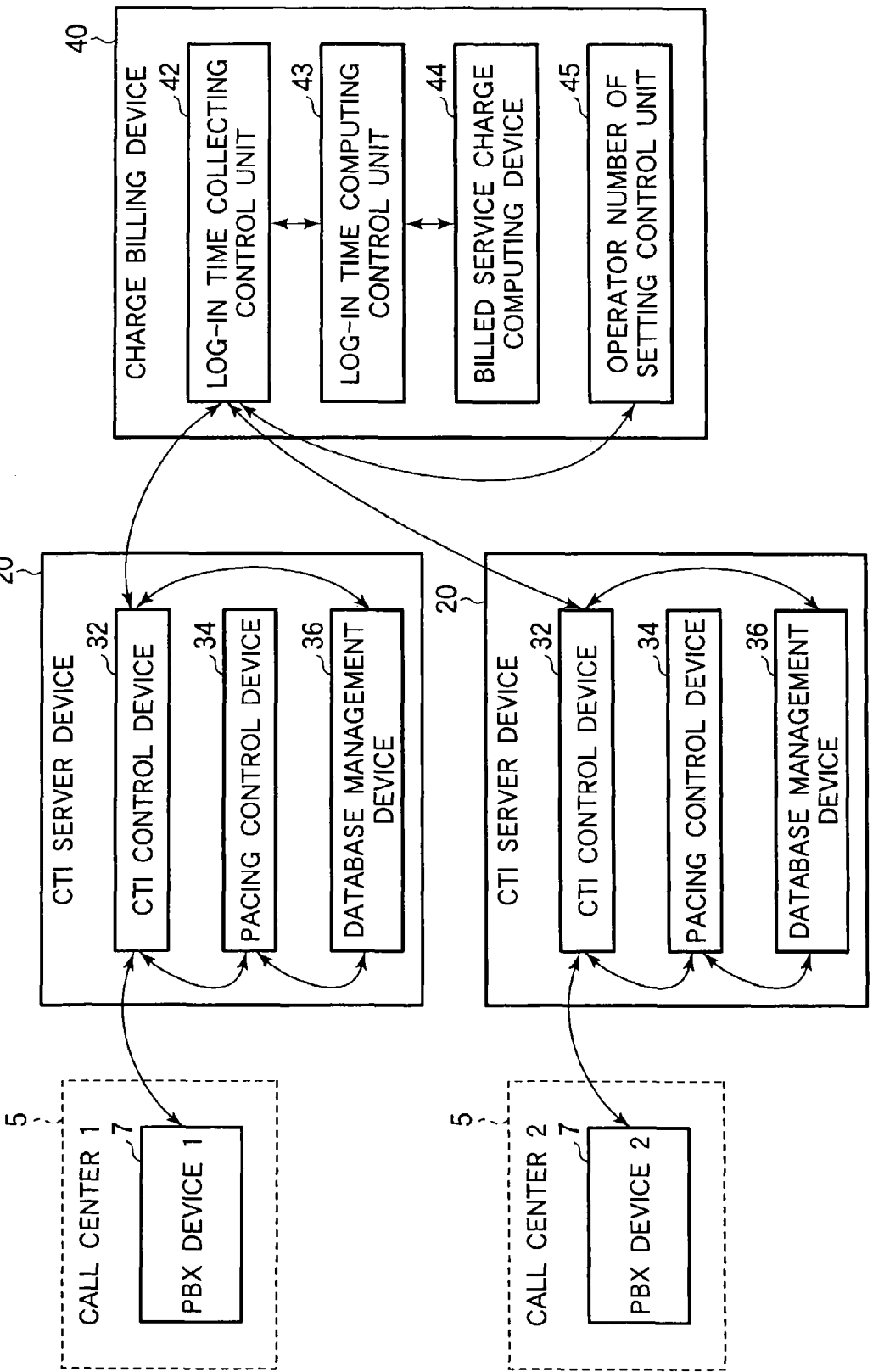
FIG. 5 is a block diagram illustrating the configuration of the fourth embodiment.

FIG. 5 is a block diagram illustrating the configuration of the fourth embodiment to which the present invention is applied.

In the fourth embodiment, there are provided two CTI server devices 20 to which one or more separate call center apparatus 5 are connected, each of which comprises the PBX 7 and a plurality of operator devices 10 (not shown). It is also acceptable to provide more than two CTI server devices 20. The CTI server device 20 comprises the CTI control device 32, the pacing control device 34, and the database management device 36. In addition, one charge billing device 40 is provided to a plurality of CTI server devices 20. The charge billing device 40 comprises the log-in time collecting control unit 42, the log-in time computing unit 43, the billed service charge computing device 44, and the operator number setting control unit 45.

In this embodiment, a WAN that employs the connecting device 18A, the connecting device 18B, or other equivalent device or communication network connects between the separate call center apparatus 5 and the CTI server device 20 and between the CTI server device 20 and the charge billing device 40. Alternatively, other communication means may connect between them.

The common portion to these first to fourth embodiments is explained below.

Figures 6, 7:
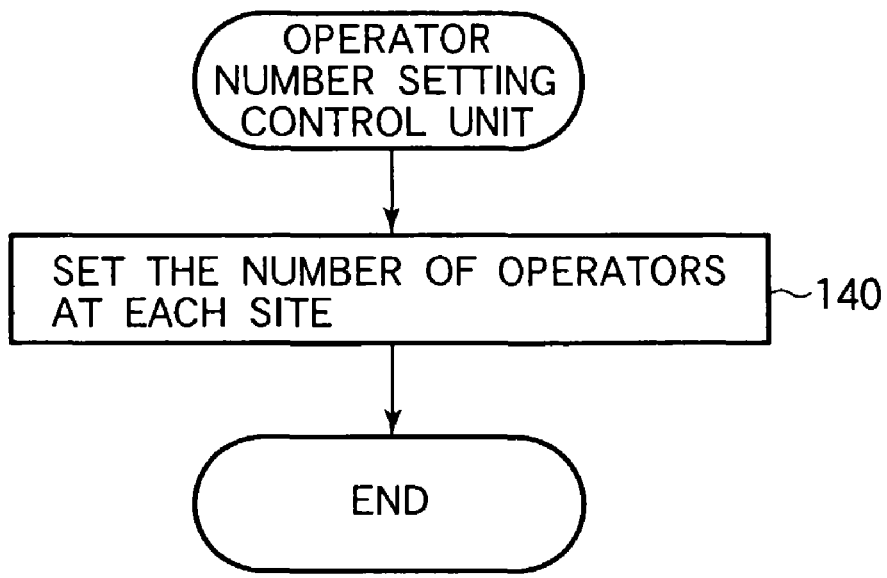
FIG. 6 is a flowchart illustrating the processing in an operator number setting control unit.
FIG. 7 is a diagram illustrating an operator number management table to be employed in these embodiments.

FIG. 6 is a flowchart illustrating the processing in an operator number setting control unit 45 according to the embodiments described above.

In this figure, in step 140, the number of operators is set for each site. In the operator number management table as shown in FIG. 7, this setting is performed by writing data or the number of operators N into the record of the corresponding site indicated by a site number.

Incidentally, the site is the unit of users that commissions call center services, serving as a unit to which the charge for the commissioned call center service is billed. Alternatively, the site may be defined as a separate location where each of the separate call center apparatus 5 is installed. In addition, the number of operators N is the number of contracted operators under a contract with each user commissioning call center services, or the number of operators provided for the call center service commissioned by the user.

Figure 8:
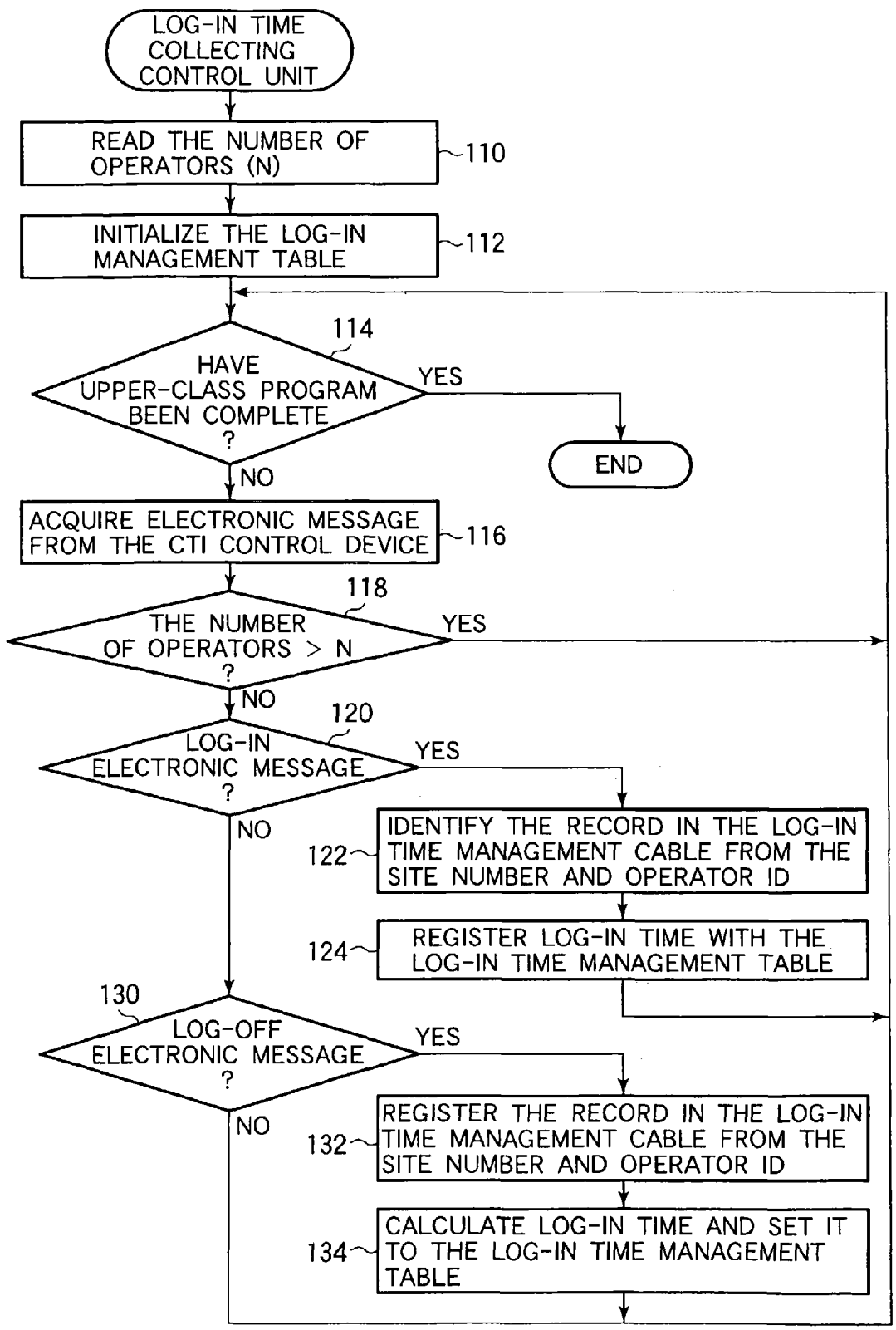
FIG. 8 is a flowchart illustrating the processing in a log-in time collecting control unit according to these embodiments.

FIG. 8 is a flowchart illustrating the processing in a log-in time collecting control unit 42 according to these embodiments.

In this flowchart, first, in step 110, the system reads the number of operators N which has been written in the operator number management table by the operator number setting control unit 45. In step 112, the log-in time management table shown in FIG. 9 is initialized.

In the log-in time management table, a record is constructed for each operator. In addition, each record is made up of data on a site number indicative of the site to which an operator is allocated or belongs, an operator ID for identifying the operator, a campaign ID for identifying the campaign to which the operator is allocated, a campaign identifier for identifying the type of campaign to which the operator is allocated, a time of day when he or she logs in, and a log-in time.

Incidentally, in these embodiments, the type of campaign is classified into an outbound service utilizing the predictive calling function, an outbound service utilizing the preview calling function, an inbound service, and a blend service or a mixture of these outbound and inbound services.

Incidentally, being logged-in is the state of an operator in which the operator is seated at his or her own place and available for operations of the operator device 10 such as the telephone 12 and client device 14 (or the state available for handling services). The operator himself or herself conducts a particular "log-in activity" at the client device 14, thereby indicating that the operator has turned into that state. In addition, when the operator is going to leave his or her seat or to be in the state of being unavailable for handling services, the operator himself or herself conducts a particular "log-out activity" at the client device 14, thereby indicating that the operator has turned into the state.

In step 114, it is determined whether the program above a program that implements the log-in time collecting control unit 42 has been executed. If the execution has been completed, the entire processing of FIG. 8 is ended. If the execution has not been completed, the process proceeds to the subsequent step 116.

In step 116, the log-in time collecting control unit 42 receives the electronic message as shown in FIG. 10 from the CTI control device 32. The electronic message is made up of a site number, an operator ID, an electronic message identifier, a campaign ID, and a campaign identifier. When an electronic message identifier indicates a log-in, the electronic message is called a log-in electronic message. On the other hand, when an electronic message identifier indicates a log-off, the electronic message is called a log-off electronic message. Such an electronic message makes it possible to recognize a new log-in or log-off of an operator indicated by an operator ID at a site designated by a site number.

Furthermore, in step 116, the log-in time collecting control unit 42 receives the electronic message and then sends the electronic message of FIG. 11 to the CTI control device 32 as the response to the received electronic message. The electronic message is made up of an operator ID and a result code.

Then, in step 118, it is determined whether the number of currently log-in operators is greater than N that has been read from the operator number management table in the site indicated by the received electronic message. If the number has been determined to be greater than N, the process branches to the front of step 114. If the number has been determined to be less than N, then the process proceeds to step 120.

In step 120, it is determined whether the electronic message currently received from the CTI control device 32 is a log-in electronic message.

If it is a log-in electronic message, then in step 122, identified is the record in the log-in time management table of the operator indicated by an operator ID in the site designated by the site number of the electronic message. In addition, in step 124, the log-in time of the record is registered. After that, the process branches to the front of the step 114.

If it has been determined in step 120 that the electronic message is not a log-in electronic message, it is then determined in step 130 whether the electronic message currently received from the CTI control device 32 is a log-off electronic message.

If the electronic message is a log-off electronic message, then identified in step 132 is the record in the log-in time management table of the operator indicated by the operator ID at the site designated by the site number of the electronic message. In addition, in step 134, the log-in time of the operator is calculated and set to the record in the log-in time management table. After that, the process branches to the front of step 114.

On the other hand, if it has been determined in step 130 that the electronic message is not a log-off electronic message, then the process branches to the front of step 114.

As described above, the processing in the flowchart performed in the log-in time collecting control unit 42 allows the log-in time of individual operators to be calculated and stored in the log-in time management table.

FIG. 12 is a flowchart illustrating the processing in the log-in time computing unit 43 according to these embodiments.

First, in step 152, the number of sites M is read from the site number management table as shown in FIG. 13. The number of sites is handled in the charge billing device 40 and managed in the operator number management table shown in FIG. 7, or the number of effective records in the operator number management table. Incidentally, the setting of the site number management table may be conducted in the processing of FIG. 6, subsequent to step 140, by the operator number setting control unit 45.

In step 158, it is determined whether the number of times of executions of loop (the number of loop repetitions) processing in subsequent steps 160 and 162 is greater than M. If the number has been determined to be greater than M, then the entire processing of FIG. 12 is ended.

If the number has been determined to be less than or equal to M, then in subsequent step 160, the log-in time per day and month for each site is calculated. In addition, in subsequent step 162, the log-in time per month for each operator is calculated. After step 162, the process branches to the front of step 158.

Figures 14, 15:
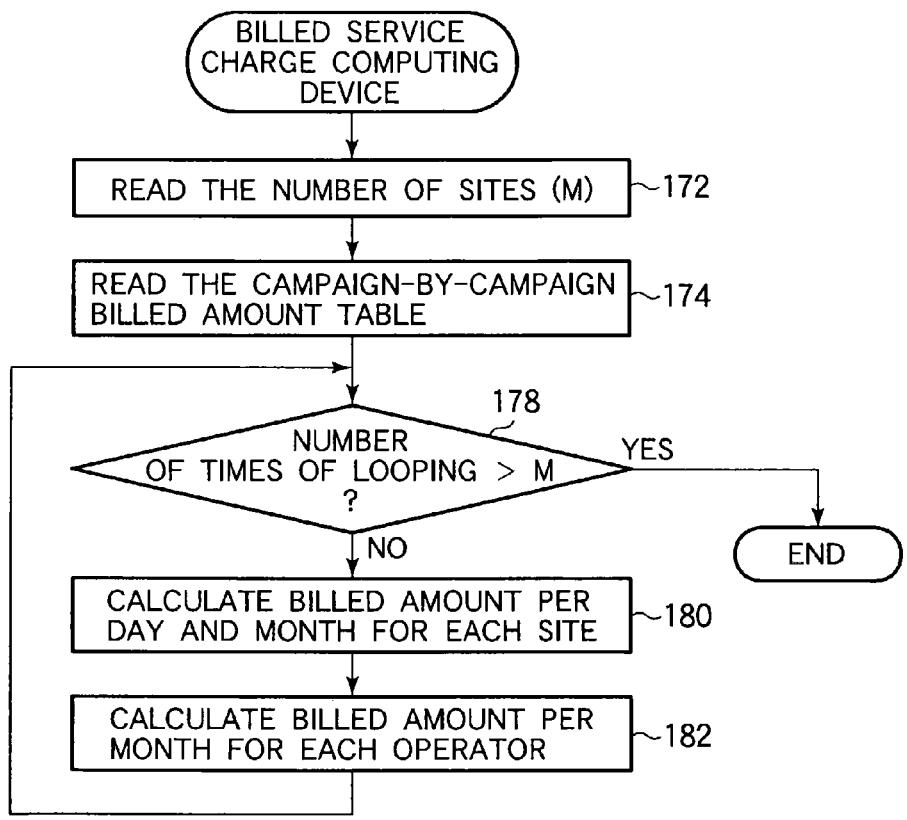
FIG. 14 is a flowchart illustrating the processing in a billed service charge computing device according to these embodiments.
FIG. 15 is a diagram illustrating a table of amount billed per each campaign, to be employed in these embodiments.

FIG. 14 is a flowchart illustrating the processing in the billed service charge computing device 44 according to these embodiments.

First, in step 172, the number of sites M is read from the site number management table as shown in FIG. 13. In step 174, a campaign-by-campaign billed amount table as shown in FIG. 15 is read. In the campaign-by-campaign billed amount table, the amount billed to a user commissioning call center services is accumulated by the type of campaign.

In step 178, it is determined whether the number of executions of loop processing (the number of loop repetitions) in subsequent steps 180 and 182 is greater than M. If the number has been determined to be greater than M, then the entire processing of FIG. 14 is ended.

If the number has been determined to be less than or equal to M, then in subsequent step 180, the amount billed per day and month for each site is calculated, thereby updating the corresponding record in the site-by-site table of amount billed per day and month. In the site-by-site table of amount billed per day and month, as a record for each operator, the amount billed to the user commissioning call center services is accumulated by the type of campaign. Incidentally, with each site being associated with a user commissioning call center services, the amount billed can be determined for each site, thereby determining the amount billed to each user.

In addition, in subsequent step 182, the amount billed per month for each operator is calculated to update the corresponding record in the operator-by-operator table of amount billed per month as shown in FIG. 17 in accordance with the resulting calculation. After step 182, the process branches to the front of step 178. In the operator-by-operator table of amount billed per month, as a record for each service date, the amount billed to the user commissioning call center services is accumulated by the type of campaign.

Here, in these embodiments, the amount billed Y for one hour logged in by one operator is determined by the following equation. That is, $$Y=[\exp(-X\times\alpha)\times\beta]\times\gamma \quad (1)$$

where, in the above equation (1), X is the number of contracted operators in the contracted commissioned call center services, and $\alpha$, $\beta$, and $\gamma$ are weighting factors. In addition, in the above equation (1), [ ] represents a function for raising decimals of the numerical value therein to the next whole number.

Figures 18, 19:
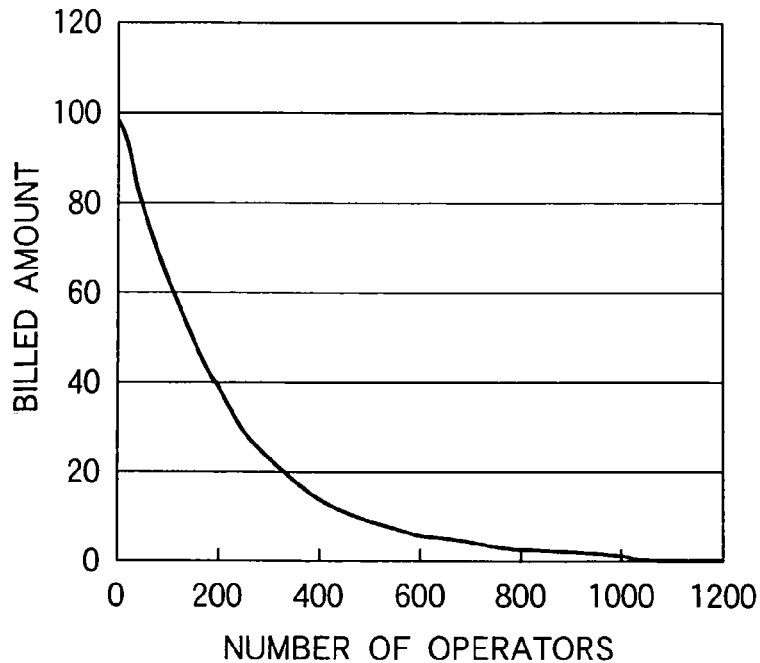
FIG. 18 is a graph showing the amount billed for one hour logged in by a single operator in these embodiments.
FIG. 19 is a diagram illustrating the amount billed for one hour logged in by a single operator in these embodiments.

For example, suppose $\alpha$ is 200, $\beta$ is 100, and $\gamma$ is 1. In this case, the amount billed for one hour logged in by one operator, corresponding to the number of contracted operators in contracted commissioned call center services, is as shown in FIG. 18. In addition, listing numerical values gives a table shown in FIG. 19.

As in equation (1), the amount billed Y is preferably an exponential function of the number of contracted operators X. However, in the function exp( ) of the exponential function, the value inside the ( ) is negative, thus representing an exponential function that makes the amount billed Y decrease as the number of operators X increases.

For the amount billed for one hour logged in by one operator being determined as such, the amount billed for one hour logged in by one operator decreases as the number of contracted operators for commissioned call center services increases. This is in tune with the real picture for the provider commissioned by call center services in that the operating cost per one operator decreases as the number of contracted operators increases.

As described above, the present invention can be applied effectively to these embodiments. Accordingly, a charge is calculated and billed for the amount of use of commissioned call center services in accordance with the usage pattern of users, thereby promoting the commissioning of call center services and making it possible to provide a technique of operating a call center system without a huge amount of capital investment.

In addition, in these embodiments, in each record of the site-by-site table of amount billed per day and month of FIG. 16, the amount billed to each user commissioning call center services is accumulated by the type of campaign. In addition, in each record of the operator-by-operator table of amount billed per month of FIG. 17, the amount billed to each user commissioning call center services is accumulated by the type of campaign. Accordingly, in these embodiments, it is possible to calculate the amount of charge billed by the campaign (service). For example, it is possible to determine the amount of charge billed for individual inbound services such as the predictive calling campaign or the preview calling campaign. Alternatively, it is possible to simply determine the amount of charge billed for the entire campaign of inbound services. Alternatively, it is possible to determine the amount of charge billed for the blend campaign that enables both the inbound and outbound services.

Since the amount billed to each user commissioning call center services is accumulated by the type of campaign as described above, it is possible to notify the user of the billing statement by the type of campaign. In addition, knowing the billing statement by the type of campaign, the user can analyze the effective assignment of the type of campaigns upon commissioning call center services and thereby reduce costs.

In addition, in these embodiments, the electronic message from the CTI control device 32 to the log-in time collecting control unit 42 makes it possible to notify a connection (contact) with the customer 3 in outbound services and a connection (contact) with the customer 3 in inbound services. This allows the charge billing device 40 to collect the number of contacts at each site, and to determine the amount of charge billed to a user commissioning call center services in accordance with the collected result.

INDUSTRIAL APPLICABILITY

According to the present invention, a charge is calculated and billed for the amount of use of commissioned call center services in accordance with the usage pattern of users, thereby promoting the commissioning of call center services and making it possible to provide a technique of operating a call center system without a huge amount of capital investment.

The invention claimed is:

1. A call center commissioned-service charge billing method for billing a charge to one or more users commissioning a call center service, comprising the steps of:

connecting the call center and a call center commissioned-service charge billing device by a communication means, the call center includes a computer telephony integration (CTI) server device and a public branch exchange (PBX), wherein the CTI server device controls the PBX;

making communication between the CTI server device and the call center commissioned-service charge billing device;

setting a number of contracted operators for a commissioned call center service into an operator number management table in response to a request of a user of commissioning the call center service;

calculating a log-in time of an operator by a log-in time management table;

collecting respective log-in times for each user and storing the log-in times into an operator-by-operator table of amount billed;

calculating an amount of charge billed for each user of commissioning the call center service in accordance with a total sum of log-in time added for each user of commissioning the call center service, and storing the amount of charge billed into a billed amount table for each user of commissioning the call center service; and deciding the charge billed to each user of commissioning the call center service for each kind of campaign, and storing the decided charge billed into a campaign-by-campaign billed amount table, wherein the amount of charge billed (Y) to each user of commissioning the call center service for one hour logged in by one contracted operator is calculated by the following equation:

$Y=[\exp(-X \times \alpha) \times \beta] \times \gamma;$ where X is the number of contracted operators, $\alpha$, $\beta$ and $\gamma$ represent weighting factors, and brackets represent a function for raising decimals of a numerical value therein to a next whole number.

2. A call center commissioned-service charge billing method for billing a charge to one or more users commissioning a call center service, comprising the steps of:

connecting the call center and a call center commissioned-service charge billing device by a communication means, the call center includes a computer telephony integration (CTI) server device and a public branch exchange (PBX), wherein the CTI server device controls the PBX;

making communication between the CTI server device and the call center commissioned-service charge billing device;

setting a number of contracted operators for a commissioned call center service into an operator number management table in response to a request of a user of commissioning the call center service;

calculating a number of effective connections through which the operators have succeeded in contacting with a customer;

collecting a respective number of times of contact for each user, and storing the number of times into an operator-by-operator table of amount billed;

calculating an amount of charge billed for each user of commissioning the call center service in accordance with a total number of contacts added for each user of commissioning the call center service; and deciding a charge billed to each user of commissioning the call center service for each kind of campaign, and storing the decided charge billed into a campaign-by-campaign billed amount table, wherein the amount of charge billed (Y) to each user of commissioning the call center service for one effective connection is calculated by the following equation:

$Y=[\exp(-X \times \alpha) \times \beta] \times \gamma;$ where X is the number of contracted operators $\alpha$, $\beta$ and $\gamma$ represent weighting factors, and brackets represent a function for raising decimals of a numerical value therein to a next whole number.

3. A call center commissioned-service charge billing system for billing a charge to one or more users commissioning a call center service, comprising:

communication means for connecting the call center and a call center commissioned-service charge billing device, the call center includes a computer telephony integration (CTI) server device and a public branch exchange (PBX), wherein the CTI server device controls the PBX;

communication means for making communication between the CTI server device and the call center commissioned-service charge billing device;

means for setting a number of contracted operators for a commissioned call center service in response to a request of a user of the call center commissioned-service;

means for calculating a log-in time of an operator;

means for collecting respective log-in times for each user;

means for storing the calculated log-in times;

means for calculating an amount of charge billed for each user of the call center commissioned-service in accordance with a total sum of log-in time added for each user of the call center commissioned-service; and means for decreasing the amount of charge billed for the log-in time of the operator according to an increase in the number of contracted operators for the commissioned call center service, wherein the amount of charge billed (Y) to each user of commissioning the call center service for one hour logged in by one contracted operator is calculated by the following equation:

$Y=[\exp(-X \times \alpha) \times \beta] \times \gamma;$ where X is the number of contracted operators $\alpha$, $\beta$ and $\gamma$ represent weighting factors and brackets represent a function for raising decimals of a numerical value therein to a next whole number.

4. A call center commissioned-service charge billing system for billing a charge to one or more users commissioning a call center service, comprising:

communication means for connecting the call center and a call center commissioned-service charge billing device, the call center includes a computer telephony integration (CTI) server device and a public branch exchange (PBX), wherein the CTI server device control the PBX;

communication means for making communication between the CTI server device and the call center commissioned-service charge billing device;

means for setting a number of contracted operators for a commissioned call center service in response to a request of a user of the call center commissioned-service;

means for calculating a log-in time of an operator;

means for collecting respective log-in times for each user;
means for storing the calculated log-in time;
means for calculating an amount of charge billed for each user of the call center commissioned-service in accordance with a total sum of log-in time added for each user of the call center commissioned-service; and
means for deciding an amount of charge billed in accordance with a kind of campaign for each user of the commissioned call center service, wherein
the amount of charge billed (Y) to each user of commissioning the call center service for one hour logged in by one contracted operator is calculated by the following equation:

$$Y=[\exp(-X\times\alpha)\times\beta]\times\gamma;$$

where X is the number of contracted operators, $\alpha$, $\beta$ and $\gamma$ represent weighting factors, and brackets represent a function for raising decimals of a numerical value therein to a next whole number.

5. A call center commissioned-service charge billing system for billing a charge to one or more users commissioning a call center service, comprising:
communication means for connecting the call center and a call center commissioned-service charge billing device, the call center includes a computer telephony integration (CTI) server device and a public branch exchange (PBX), wherein the CTI server device controls the PBX,
communication means for making communication between the CTI server device and the call center commissioned-service charge billing service;
means for setting a number of contracted operators for a commissioned call center service in response to a request of a user of the call center commissioned-service;
means for calculating a number of effective connections through which the operators have succeeded in contacting with a customer;
means for collecting a respective number of times of contact for each user;
means for calculating an amount of charge billed for each user of the call center commissioned-service in accordance with a total number of contacts added for each user of the call center commissioned-service; and
means for deciding an amount of charge billed in accordance with a kind of campaign for each user of the commissioned call center service, wherein
the amount of charge billed (Y) to each user of commissioning the call center service for one effective connection is calculated by the following equation:

$$Y=[\exp(-X\times\alpha)\times\beta]\times\gamma;$$

where X is the number of contracted operators, $\alpha$, $\beta$ and $\gamma$ represent weighting factors, and brackets represent a function for raising decimals of a numerical value therein to a next whole number.

6. The call center commissioned-service charge billing system according to claim 5, wherein an effective connection is determined through a computer input by the operator during contact with a customer.

7. The call center commissioned-service charge billing system according to claim 5, wherein an effective connection is determined through a call by the operator with a customer for more than a predetermined period of time.

8. The call center commissioned-service charge billing system according to claim 5, further comprising an operator-by-operator table of amount billed.

9. The call center commissioned-service charge billing system according to claim 5, further comprising a campaign-by-campaign billed amount table.

10. The call center commissioned-service charge billing system according to claim 5, further comprising a billed amount table for each user of the commissioned call center service.

11. A computer readable storage medium having a computer program stored thereon for implementing the call center commissioned-service charge billing method according to claim 1.

12. A computer readable storage medium having a computer program stored thereon for implementing the call center commissioned-service charge billing method according to claim 2.

13. A computer readable storage medium having a computer program stored thereon for implementing the call center commissioned-service charge billing system according to claim 3.

14. A computer readable storage medium having a computer program stored thereon for implementing the call center commissioned-service charge billing system according to claim 4.

15. A computer readable storage medium having a computer program stored thereon for implementing the call center commissioned-service charge billing system according to claim 5.

16. A computer readable storage medium having a computer program stored thereon for implementing the call center commissioned-service charge billing system according to claim 6.

17. A computer readable storage medium having a computer program stored thereon for implementing the call center commissioned-service charge billing system according to claim 7.

18. A computer readable storage medium having a computer program stored thereon for implementing the call center commissioned-service charge billing system according to claim 8.

19. A computer readable storage medium having a computer program stored thereon for implementing the call center commissioned-service charge billing system according to claim 9.

20. A computer readable storage medium having a computer program stored thereon for implementing the call center commissioned-service charge billing system according to claim 10.

* * * * *